United States Patent [19]

Northrup et al.

[11] Patent Number: 4,640,416

[45] Date of Patent: Feb. 3, 1987

[54] DISK STORAGE AND CARRYING CASE

[75] Inventors: Allan R. Northrup; John G. Tomkinson, both of King County, Wash.

[73] Assignee: Amaray International Corporation, Redmond, Wash.

[21] Appl. No.: 722,936

[22] Filed: Apr. 12, 1985

[51] Int. Cl.⁴ .............................................. B65D 85/57
[52] U.S. Cl. .................................... 206/425; 206/309; 206/444; 206/508; 220/324; 220/338
[58] Field of Search ............... 206/309, 311, 425, 444, 206/445, 503, 508, 509; 220/22.1–22.5, 324, 338

[56] References Cited

U.S. PATENT DOCUMENTS

| Re. 30,624 | 5/1981 | Soulakis et al. |
|---|---|---|
| D. 170165 | 8/1953 | Roop. |
| D. 243526 | 3/1977 | Overman ............................ D. 19/76 |
| D. 267911 | 2/1983 | Long. et al. ....................... D. 19/76 |
| D. 281464 | 11/1985 | Drake ................................ D. 19/76 |
| D. 283906 | 5/1986 | Goertz ............................... D. 19/76 |
| 3,035,587 | 5/1962 | Schade ............................. 220/22.5 |
| 3,140,007 | 7/1964 | Nettleship ........................... 206/508 |
| 3,334,635 | 8/1967 | Fleischhauer et al. ........... 220/22.5 |
| 3,338,468 | 8/1967 | Wilson ............................... 206/508 |
| 3,347,394 | 10/1967 | Gould ................................ 206/509 |
| 3,360,116 | 12/1967 | Somers et al. .................... 206/45.13 |
| 3,979,016 | 9/1976 | Frater ................................ 220/324 |
| 4,012,087 | 3/1977 | Edwards, Jr. ...................... 206/425 |
| 4,015,350 | 4/1977 | Zurwelle ............................ 40/372 |
| 4,164,309 | 8/1979 | Staats. |
| 4,325,595 | 4/1982 | Solomon ........................... 312/183 |
| 4,366,904 | 1/1983 | Roskvist. |
| 4,498,583 | 2/1985 | Long et al. |

FOREIGN PATENT DOCUMENTS

| 1532466 | 6/1968 | France ............................. 206/425 |
|---|---|---|
| 2528611 | 12/1983 | France ............................. 206/309 |
| 8201810 | 6/1982 | PCT Int'l Appl. ................. 206/444 |

OTHER PUBLICATIONS

Flip 'N' File/25–Flip 'N' File brochure, copyright '83, no month, Innovative Concepts, San Jose, Calif.
Digital Retailing magazine, p. 57, Sep. 1983.
Office Equipment Exporter magazine, 1983, no month, pp. 61, 102 and 113, Mini-Disk File by International Data Wares, Inc.
Computer Supplies catalog, 1983, SJB Distributors, Inc., Dallas, Tex., pp. 6 and 7.

Primary Examiner—William Price
Assistant Examiner—Jimmy G. Foster
Attorney, Agent, or Firm—Seed and Berry

[57] ABSTRACT

A case for floppy disks and other similarly shaped articles is disclosed. The case has a plurality of dividers having a limited arcuate travel to support the disks at an advantageous viewing angle. The case is also provided with a lid which contacts the base of the case along two different axes and the supporting surface simultaneously to prevent the case from tipping. The case is also provided with a handle for carrying the case in a vertical position. The lid is further provided with ridges to prevent disks or other articles contained between the dividers from sliding out of the dividers when the case is carried in a vertical position.

20 Claims, 7 Drawing Figures

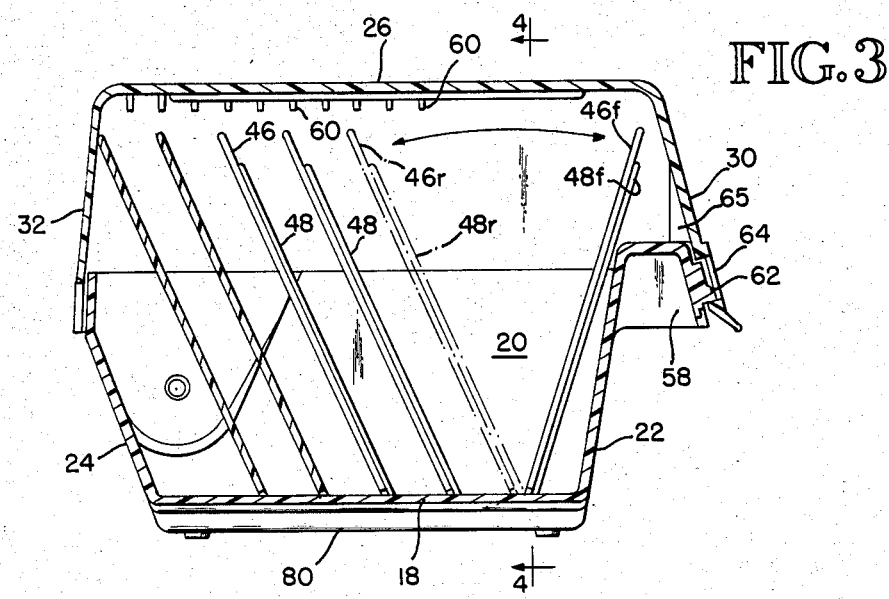
FIG. 3
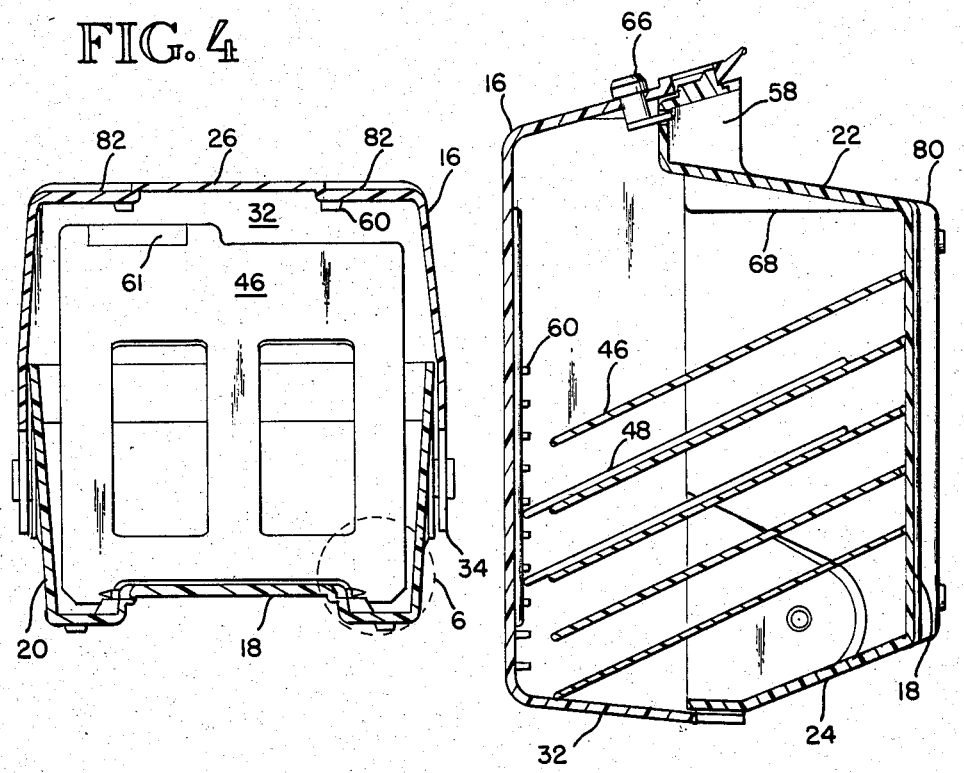
FIG. 4
FIG. 5

DISK STORAGE AND CARRYING CASE

DESCRIPTION

1. Technical Field

The invention relates to an apparatus for storing, organizing and transporting disks. Specifically, the invention relates to a disk storage and carrying case unit for magnetic computer floppy, compact audio and video disks and similarly shaped articles.

2. Background of the Invention

The recent introduction of personal computers, digital audio and laser video equipment in larger numbers to the consuming public has generated a need for storing magnetic floppy disks and other disks on desk tops near such computers and equipment. The relatively recent standardization of disk sizes and compatability of computer programs has also generated a need for disk storage containers which can effectively organize, store and serve as carrying containers for such disks. Presently, many audiophiles and computer users use a variety of storage devices including shoe boxes for storing such disks. These devices are often unsturdy and inconvenient to use.

Commercially available storage containers while more suitably adapted for disk storage than shoe boxes suffer from other disadvantages. Some units are unstable when their hinged lid is in an open position. Some units, while allowing floppy disks to be stored between dividers to categorize and organize the disks, allow the disks to fall out of the dividers into a hinged lid when the container is carried in a vertical position.

Generally, the disk storage devices presently available for use by the general consumer have not been designed to afford maximum convenience and versatility for the use, transport and efficient storage of disks.

DISCLOSURE OF THE INVENTION

Thus, it is an object of the invention to provide a portable storage and carrying case for magnetic floppy disks and other disks which separates and segregates the disks.

It is also an object of the invention to provide a portable storage and carrying case which is stable when the lid is open.

It is another object of the invention to provide a storage and carrying case which constrains the disks between dividers provided therein when the case in carried in a vertical position.

It is yet another object of the invention to provide a storage and carrying case which holds the disks at an advantageous viewing position when the case is in use.

It is still another object of the invention to provide a disk storage and carrying case which increases the number of disks which may be stored on a desk or table surface.

The invention achieves these objectives by providing a disk storage and carrying case unit adapted to store disks in an organized fashion. The unit has a base adapted to contain the disks within an elongated storage area and a hinged lid to enclose the storage area. A plurality of dividers are provided within the storage area for separating, segregating and displaying the disks. The lid is constructed so that when in a fully open position the base maintains stability and is biased against tipping. The front of the base forms an integral handle to allow the unit to be carried in a vertical position. The dividers can pivot within the base through a limited arc so that the disks are supported in the unit by the bottom of the base and the divider itself. Thus, a rearward maximum divider angle can be selected to hold a disk at an optimum viewing angle. The lid is provided with ridges which prevent disks from sliding out from between the dividers when the unit is carried in a vertical position from the handle. The handle is also provided with means for securing the lid to the base in a closed position so that the lid will not open unexpectedly.

In a second embodiment, the base and lid have a width sufficient to hold two columns of disks side-by-side with a center wall dividing the columns from one another and the base into two coextensive storage chambers.

In either embodiment, the front of the lid can have a lock which engages the base to provide extra security for disks stored therein. The bottom of the base is formed with a raised central portion to further form support legs which are adapted to rest in depressions in the lid of another identical unit so that the units can be stacked one above the other to more efficiently utilize desk space near a personal computer.

BRIEF DESCRIPTION OF THE DRAWINGS

FIG. 3 is a cross-sectional view of a unit in FIG. 1 looking generally in the direction of arrows 3—3 of FIG. 1.

FIG. 4 is a cross-section of a unit looking generally in the direction of arrows 4—4 of FIG. 3.

FIG. 5 is a cross-sectional view, similar to FIG. 3, of a unit in a vertical carrying position.

BEST MODE FOR CARRYING OUT THE INVENTION p Referring now in detail to the drawings, the numerals herein refer to like numbered parts in the figures.

Figure 1:
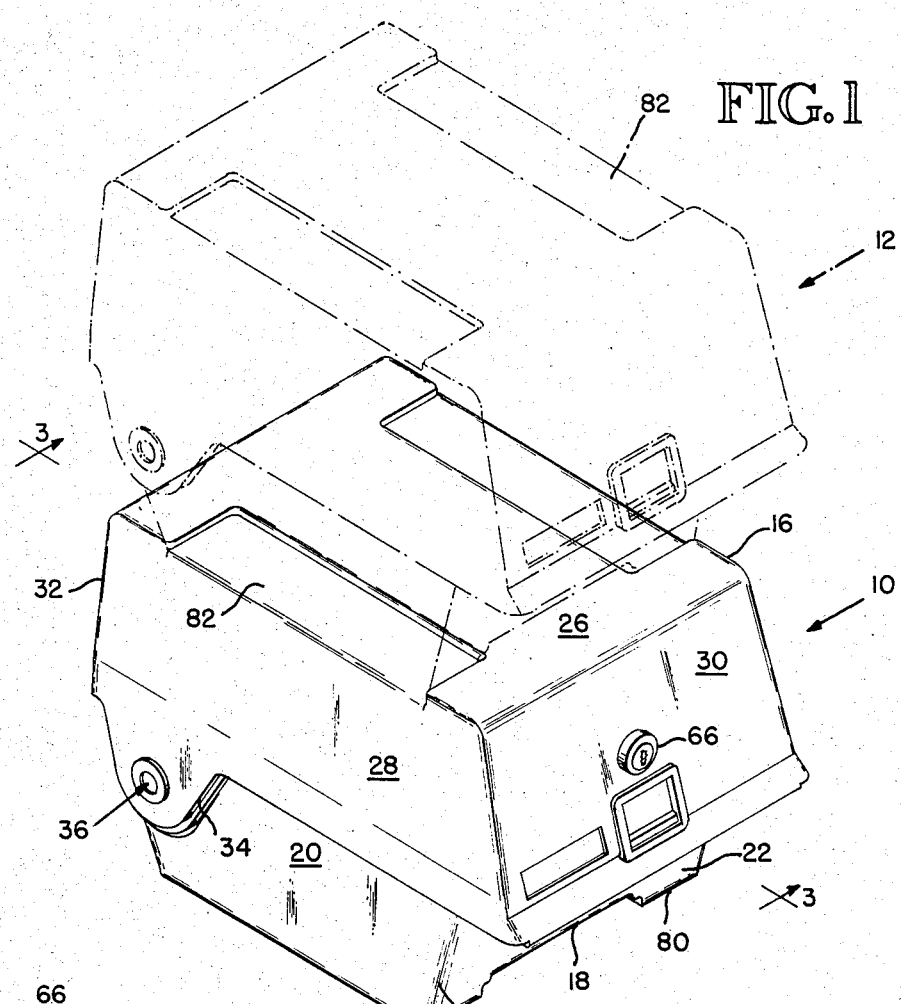
FIG. 1 is an isometric view of two disk storage and carrying case units in accordance with the present invention, stacked one above the other.

In FIG. 1, a disk storage and carrying case is generally indicated at reference numeral 10. A second identical case 12 is shown in phantom stacked above the first case.

The case has a base 14 and a lid 16. As shown in FIGS. 1 through 4, the base has a bottom 18 two substantially upright sides 20, a forwardly angled front 22 and a rearwardly angled back 24. The bottom, sides, front and back are joined at their respective edges to form an elongated storage area or receptacle for magnetic floppy disks or other items of similar shape. The dimensions of the base and other components of the case can be selected to store conventional 5¼ inch disks, 3½ inch diskettes or any other size as desired.

Figure 2:
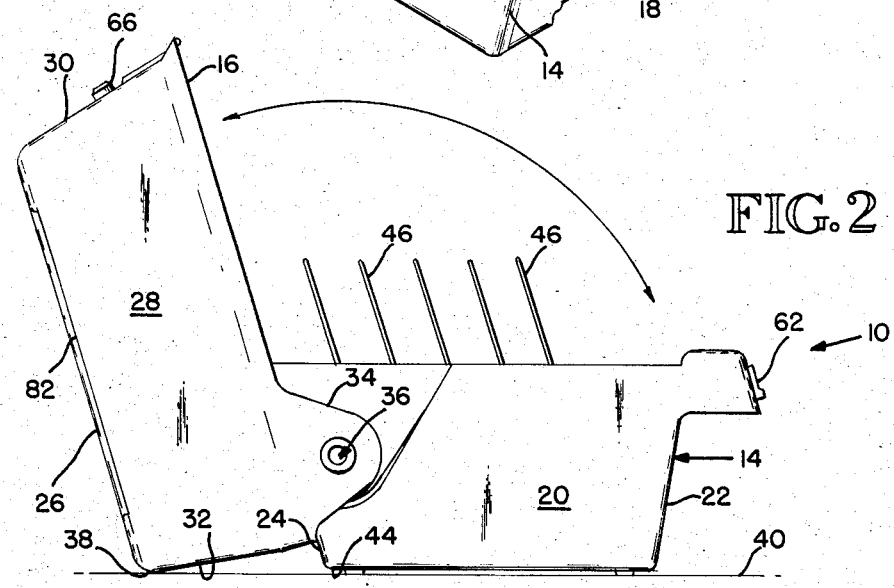
FIG. 2 is a side elevation of the unit of FIG. 1 with the lid in an open position.

The lid 16 has a top 26, two depending sides 28, a depending, rearwardly angled front 30 and a depending, forwardly angled back 32. The lid also has downwardly depending, side extensions 34 which allow the lid to pivot about a horizontal pivot axis, indicated at reference numeral 36, which is well below the top edge of the base 14. The lid and base are dimensioned so that when the lid 16 is in the fully open position, as shown in FIG. 2, the back of the lid 32 is in contact with the back 24 of the base 14. When the lid is in this open position the curved junction of the back of the lid and the top 26 of the lid forming rear, top corner 38 is simultaneously in contact with the support surface 40. Thus, the corner 38 becomes the fulcrum about which the unit must rotate from forces applied due to the weight of the lid or forces on the lid. Thus, accidentally hitting the lid in a manner that would tend to cause the case to tip over backwards would be less likely to cause the case to tip over, dumping its contents. If the corner 38 were not in contact with the surface 40 when the back 32 of the lid 16 is in contact with the back 24 of the base 14, the base would tend to rotate about the junction 44 between the bottom 18 and the back 24 of the base. This would result in the case being more easily overturned backwardly spilling its contents. Thus, the configuration shown improves the stability of the unit when the lid is open.

The case 10 is provided with a plurality of removable dividers 46 as shown in the remaining figures. The dividers serve to segregate the disks by groups as chosen by the user.

Figure 6:
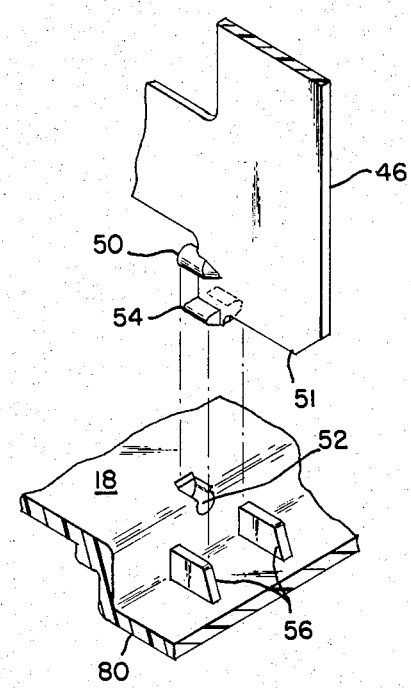
FIG. 6 is an exploded, enlarged, isometric view of circled area 6 of FIG. 3.

The case interior and the dividers are constructed so that the dividers 46 can only pivot back and forth through a limited arc. The disks 48 contained between the dividers are therefore completely supported by the dividers and the bottom 18 of the base 14 by its raised central portion. As shown in FIG. 6, this can be accomplished by providing the dividers 46 with pivot pins or stubs 50 which project inwardly from the opposite inner edges of downwardly depending tabs 51 on each divider. The tabs on the dividers flank the raised central portion of the bottom 18 of the base. Pivot notches 52 are provided along the edges of the raised central portion of the base. The pivot notches encompass somewhat more than one half of a cylindrical region so that the pivot stubs and the narrowest portion of the pivot notches slightly resiliently deform when the stubs are engaged with the notches. Once seated in the notches, the pivot stubs are free to rotate. The pivot stubs are thus adapted to be captively held in corresponding pivot notches 52 in the edges of the raised portion of the bottom 18 of the base 14. The pivot stubs 50 are located above the bottom of the depending tabs. Transverse divider projections 54 are provided on the front and rear face of the depending tabs at a level below the pivot stubs 50 to limit the arcuate travel of the divider. The ends of the projections 54 rest against regularly spaced stops 56. The stops 56 extend from the bottom 18 and the outer edges of the raised central portion of the bottom. The length of the divider projections 54 and the spacing and/or thickness of the stops 56 can be selected so that the divider travels only through a limited arc as desired. Preferably the arc of travel is symmetrical about a normal to the surface of the bottom of the base. It has been found that an arc travel 30° forward or rearward of a normal to the base prevents the disks contained between two adjacent dividers from resting too heavily upon one another. This limited arc travel also permits disks, such as those supported by the first rearwardly pivoted divider 46, in FIG. 3, to hold a disk 48, at an advantageous viewing angle when the remaining forwardly positioned disks, such as those supported by pivoted divider 46,, and hence forwardly pivoted disk 48, are pivoted to their forward most position. The angled front 22 of the base 14 can be sloped at an angle which corresponds to the maximum forward angle of a divider so that forward pivoted dividers do not rest on the inside of the front of the base.

The case 10 is also provided with a handle 58 which can be integral with the angled front 22 of the base 14. This allows the case to be conveniently carried in a vertical position as shown in FIG. 5 for transporting the disks.

To prevent the movement of disks during carrying, a plurality of substantially parallel ridges 60 are provided on the inside of the top 26 of the lid 16. The ridges 60 extend inwardly towards the storage area. The ridges are preferably formed by two parallel rows of projections in which the individual projections are aligned transversely in pairs. The top edges of some of the disks, which are segregated by the dividers and constrained between the dividers, slide to engage the ridges when the unit is carried in a vertical position. As shown in FIG. 5, the disks so caught cannot slide between the lid 16 and the rearwardly pivoted dividers due to the ridges 60. The disks so caught support the others above them. This maintains the position of the disks in the case during carrying.

The lid 16 is designed with the angled front 30 angled outwardly, away from the storage area so that a clearance is maintained between a forward-most divider 46, in a forward-most pivoted position and the lid when the lid is pivoted from the open to the closed position. The divider has a vertical dimension or an index tab 61 which is taller than a disk. Thus, the lid can be closed, even though disks 46, are in a forward-most position in front of the forward-most divider, without catching the disk.

The handle 58 can be provided with button a 62 which resiliently engages a hole 64 in the angled front 30 to secure the lid in a closed position. The handle is integral with the base 14 and has portions which depend upwardly, outwardly and downwardly from the front 22. The ends of the handle are enclosed, forming support members for the handle. The angle of the downwardly depending portion of the handle conforms to the outward angle of the lid 16 so that the button resiliently engages the hole. The lid has a pair of symmetrically positioned, inwardly extending, support projections 65 which rest on the outwardly depending portion of the handle when the lid is closed. The edges of the lid which extend downwardly around the first portion of the base and the handle are closely fitted to keep dust out of the case.

As shown in FIG. 5, a lock 66 may be further provided to add extra security to the case 10. It is preferred to provide a pair of vertically and inwardly extending fins 68 or other spacers on the angled front 22 which limit the forward arcuate travel of a forward-most disk to prevent the lock mechanism from catching a disk as the lid is closed.

Figure 7:
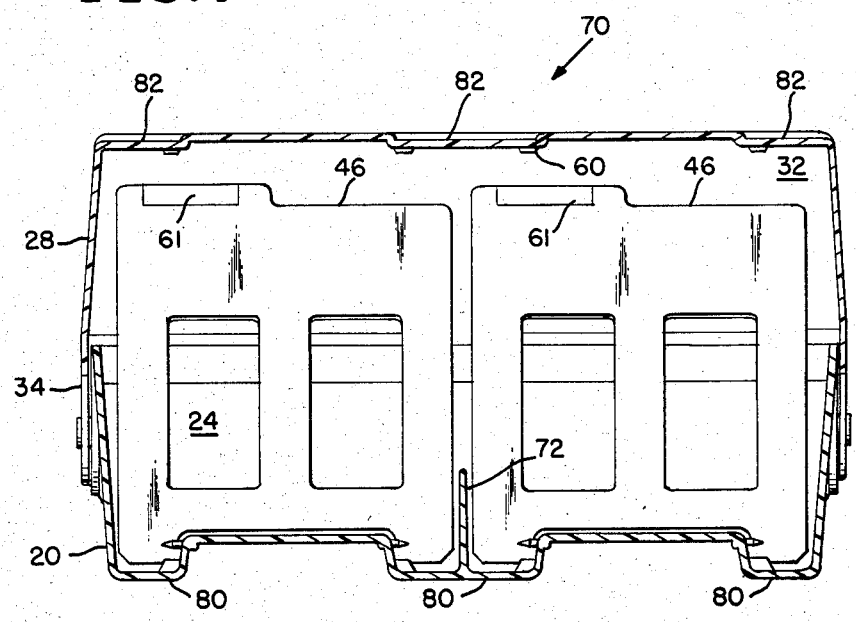
FIG. 7 is a cross-sectional view of a second embodiment of the disk storage and carrying case unit adapted to hold two columns of floppy disks.

A second embodiment of the invention is shown in FIG. 7. In this embodiment, two rows of magnetic floppy disks can be stored in the unit 70. The second embodiment is provided with a substantially upright center wall 72 extending between the front 22 and back 24 of the base 14, dividing the base into two elongated storage areas. The width of the base and the width of the lid are appropriately modified to cover the disks.

In both embodiments, the raised central portion of the bottom 18 of the base 14 defines projecting support legs 80 which are adapted to fit in corresponding depressions 82 in the lids of identical cases. Thus, the units can be stacked one above the other, as shown in FIG. 1, to maximize efficient use of surface area near computer terminals. The support legs may be further provided with non-skid surfaces to further stablize the unit. The raised central portion of the base also results in elongated support legs which nest within corresponding depressions 82 substantially along the entire length of the case. Thus, the cases are resistant to relative lateral movement when stacked. Other provisions for nesting the cases can be substituted. For example, projecting rubber feet may be provided on the support legs with the lids having corresponding depressions adapted to receive the feet of identical cases.

The lid is preferably made of a transparent acrylic material and the base of styrene, although other materials may be used.

It will be appreciated that other variations and embodiments of the invention are contemplated. For example, the lid need not be pivoted but might be removable from the base, or the integral handle may be omitted. Thus, a storage box which has dividers which support substantially two dimensional objects in an ordered fashion including a lid having a means for preventing the objects from sliding out of the dividers when the unit is tipped is considered to be part of this invention. Therefore, the scope of the invention is not to be limited by the above description, but is to be determined by the scope of the claims which follow.

We claim:

1. A storage case for floppy disks and similarly shaped articles, comprising:
   (a) a base having an open interior and forming a receptacle for receiving and storing the articles;
   (b) dividers positionable within the receptacle for separating and segregating the articles, including means for securing the dividers to the base, at least when the base is in a tipped, upright position and for securing the dividers to the base for tilting movement;
   (c) a lid for selectively enclosing and exposing the interior receptacle and wherein the lid has a top interior surface positioned in a spaced relation to the top of the articles when they are placed in the receptacle;
   (d) means for securing the lid to the base when the lid is enclosing the receptacle; and
   (e) means, extending toward the interior from the top interior surface of the lid, for engaging the top of at least some of the articles to support a portion of the article's weight and to maintain their position relative to the dividers and other stored articles when the lid is closed and the base is in a tipped, upright position.

2. The storage case of claim 1 wherein the divider securing means allows the dividers to assume a rearwardly tilted position.

3. The storage case of claim 2 further comprising means for limiting the arcuate travel of the dividers in the rearward direction.

4. The storage case of claim 3, further comprising means for limiting the arcuate travel of the dividers in a forward direction.

5. The storage case of claim 3 wherein the divider securing means comprises pivot pins near one end of the divider and a portion of the base defining pivot notches for receiving the pivot pins and wherein the arcuate travel limit means comprises transverse projections on the dividers and transverse projections connected to the base in proximity to the notches forming stops and against which the transverse projections on the dividers may abut to restrict the movement of the projection about the pivot pins so that the dividers are pivotable in a limited manner about the pivot pins.

6. The storage case of claim 5 wherein the base has a bottom having a raised central, longitudinal portion and defines exterior, elongated support legs for the case; an interior raised surface which in turn defines the pivot notches; and elongated interior depressions above the support legs; wherein the dividers have downwardly depending lateral tabs from which the pivot pins extend with the tabs extending into the interior depressions above the support legs; and wherein the transverse projections extend from the tabs; and wherein the stops extend from the interior depressions above the support legs.

7. The storage case of claim 6 wherein the lid has a portion thereof defining a pair of elongated depressions for accepting the elongated support legs of an identically structured case so that one of the cases can be stacked above the other case and wherein the upper case is restrained from substantial lateral movement relative to the lower case.

8. The storage case of claim 1, further including means, connected to the base, for limiting the forward movement of the articles and dividers and wherein the dividers have index tabs having a height extending above the top of the articles to be stored in the case and wherein the front of the lid is disposed sufficiently forward of the forward movement limitation means so that clearance is maintained between the lid and an article in a forward-most position and a forward-most divider including the index tab on the divider when the divider is in a forward pivoted position as the lid is closed.

9. The storage case of claim 1 wherein the means for engaging the top of the articles includes a plurality of substantially parallel ridges on the top of the lid extending toward the receptacle and aligned transversely with respect to the receptacle.

10. The storage case of claim 9, wherein the base includes side walls spaced to closely receive articles to limit lateral movement thereof to encourage full engagement of the articles with the ridges.

11. The storage case of claim 1, further including a handle on the front of the base for conveniently carrying the case and articles stored therein in a tipped, upright position.

12. The storage case of claim 11 wherein the base includes a front wall, a forward projecting member extending from the front wall, and a downturned lip extending from the forward projecting member, together forming the handle and wherein the front of the lid extends around the top of the handle so that a minimum clearance is maintained between the front of the lid and an article and divider in a forward-most position.

13. The case of claim 11, further including a lock connected to the lid which engages the base to secure the case and wherein the base includes inwardly extending fins on the interior front of the base to limit the forward travel of a forward-most article and divider so that a clearance is maintained between the forward-most article and divider and the lock as the lid is closed.

14. The case of claim 1 wherein the lid is pivotably connected to the base for movement toward the rear of the case and has a portion for contacting the base of a point different from the pivot axis when the lid is fully opened and the base is resting on a support surface and a second portion for contacting substantially, simultaneously the support surface upon which the base rests so that the base and lid are biased against rearward tipping when the lid is fully opened.

15. The storage case of claim 1, including means for dividing the base into at least two storage areas wherein the base and the lid have widths adapted to contain a plurality of disks in the storage areas in two rows.

16. The storage case of claim 7 wherein the pivot notches comprise more than one-half of a cylindrical cavity having one end of the cavity substantially in the base interior raised portion, the other end of the cavity exposed to the adjacent elongated interior depression and one side of the cavity exposed to the open interior in the base and wherein the pivot pins comprise cylindrical projections extending inwardly from and in the plane defined by the divider downwardly depending lateral tabs, wherein the radius of curvature of the pivot pins is slightly less than the radius of the curvature of the cylindrical cavity so that the pivot pins are engageable with the cylindrical cavities in an interference fit.

17. A storage case for floppy disks and similarly shaped articles, comprising:
 a base having an open interior and forming a receptacle for receiving and storing the articles;
 dividers positionable within the receptacle for separating and segregating the article;
 means for pivotally connecting the dividers to the base for rearward and forward arcuate movement;
 means for limiting the forward and rearward arcuate movement of the dividers;
 a lid, pivotally connected to the base and having a top interior surface positioned in a spaced relation to the top of articles when they are placed in the receptacle and when the lid is in a closed position;
 means, extending toward the interior sufficiently from the top interior surface of the lid for engaging the top of at least some of the articles to support a portion of the article's weight and to maintain their position relative to the dividers and other stored articles when the lid is in the closed position.

18. The case of claim 17 wherein the means for engaging the top of the articles includes a plurality of substantially parallel ridges on the top of the lid extending inwardly toward the receptacle and aligned transversely with respect to the receptacle.

19. The case of claim 17 wherein the pivotal connection means includes a raised, elongated, central portion in the base defining adjacent, elongated depressions, the central portion having a plurality of partial, cylindrical cavities having one end in the raised portion, the other end exposed to the adjacent depression and an open side exposed to the receptacle, and including downwardly depending tabs on the dividers and cylindrical projections extending therefrom, inwardly and in the plane defined by the tabs, the cylindrical projections engaging the cavities in an interference fit so that the tabs are free to pivot in the elongated depressions, and wherein the arcuate travel limiting means includes projections extending transversely from the ends of the tabs and below the cylindrical projections and also including projections in the base extending from the elongated depressions, spaced from the tab projections to limit the arcuate displacement thereof.

20. A storage case for floppy disks and similarly shaped articles, comprising:
 a base having an open interior forming a receptacle for receiving articles, a raised central, longitudinal portion, elongated depressions adjacent to the raised portion forming elongated support legs and a plurality of partial, cylindrical cavities in the raised portion having one end in the raised position, the other end exposed to the adjacent elongated depression and one side exposed to the open interior and projections regularly spaced between the cavities and extending upwardly from the elongated depressions;
 substantially planar dividers having downwardly depending tabs in the divider plane spaced apart sufficiently to be received in the base elongated depressions, the tabs having cylindrical projections extending inwardly and received in the base cavities to allow pivotal movement of the dividers and transverse projections at the end of the tabs and below the pivot pins for contact with the regularly spaced projections in the base to limit the arcuate travel of the dividers;
 a lid, pivotally connected to the base, having a top interior surface positioned in a spaced relation to the top of articles when they are placed in the receptacle between the dividers, and when the lid is in a closed position, including a plurality of substantially parallel ridges on the top interior surface extending sufficiently inwardly towards the receptacle and aligned with the dividers to engage the top of at least some of the articles to support a portion of the article's weight and to maintain their position relative to the dividers when the lid is closed and the base is in a tipped, upright position.

* * * * *